Figure 1:
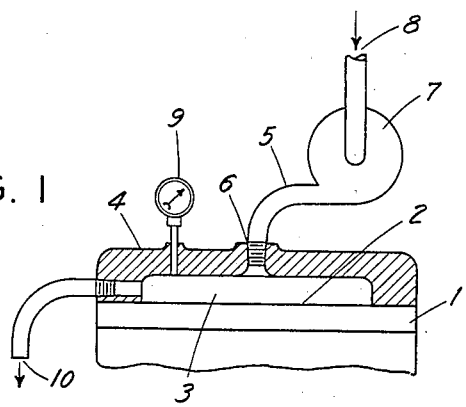

Dec. 6, 1938.　　　　　L. A. CHAMBERS　　　　　2,138,839
METHOD OF DESTROYING BACTERIA IN LIQUIDS
Filed April 30, 1934

INVENTOR
LESLIE A. CHAMBERS
BY
*Ezekiel Wolf*
ATTORNEY

Patented Dec. 6, 1938

2,138,839

UNITED STATES PATENT OFFICE 2,138,839

METHOD OF DESTROYING BACTERIA IN LIQUIDS

Leslie A. Chambers, Brookline, Mass., assignor to William H. Ashton, Edgemont, Pa.

Application April 30, 1934, Serial No. 723,027

2 Claims. (Cl. 99—217)

The present invention relates to a method of destroying bacteria or sterilizing liquid substances such as milk, beer and other known liquids which usually have considerable number of micro-organisms in them. These micro-organisms may be classed in two groups; those which do not form clumps or chains and those which do group together in this fashion. The present method of treating the liquid substances effects a reduction in both types and this is true in whatever manner the bacterial count is made.

The present invention has the further object to preserve the liquid except for the bactericidal action in the same state that it was originally, that is, in milk preventing homogenization of the cream and in beer keeping the gas in the beer.

In the present invention the method of reducing bacteria count involves the application of compressional waves under pressure and in particular compressional waves in the sonic range. In the prior application of Newton Gaines and the present applicant, Serial No. 584,562, filed January 2, 1932, killing of bacteria was obtained by the application of sonic vibrations in which the action of cavitation was not inhibited and which effect was believed to aid in the destruction of the bacteria.

A more recent investigation by me as to the effect of cavitation and the effect of the prevention of cavitation and the actual application of pressures has led to the conclusion that while cavitation may directly have the effect of providing bactericidal action in the liquid, yet it may also have the effect of increasing the bacteria count in the liquid because of splitting up the clumps of bacteria when the clump-forming type of bacteria is present.

From the recent experiments which I have made I believe that while the collapse of the cavitation bubbles or vacuolar surfaces provide an impact of exceedingly intense energy in the liquid and result in the killing of the bacteria in or near such surfaces, they also act to disrupt the liquid surface and thereby spread the bacteria to other parts of the liquid medium.

I have also determined that the compressional vibrations are continuously intensified by the application of static pressure to the liquids to which the compressional waves are applied and that the energy resulting from the application of compressional waves can with the aid of the static pressure be made as intense as the effect resulting from the collapse of the cavitation bubbles. I have also determined that with the aid of pressure such liquids as beer, which are charged with gas, may be sterilized without allowing the gas to escape. By holding the pressure back and preventing bubbles from forming, the sterilizing action is also more complete.

In the present invention the method of killing the bacteria is to apply a static pressure to a liquid flowing over a source of compressional vibrations, the static pressure being of sufficient intensity to prevent the occurrence of cavitation at any point in the flow. By preventing the occurrence of cavitation bubbles or vacuum places, the compressional vibrations are not shielded from any part of the liquid and therefore the bacteria are entirely unprotected and subject to the full force of the compressional wave energy. In addition to this by increasing the static pressure it is possible with a compressional wave source to impress a greater amount of energy in the liquid than with a liquid under a lower pressure, as the load upon the vibrating source increases with the pressure applied.

Figure 2:
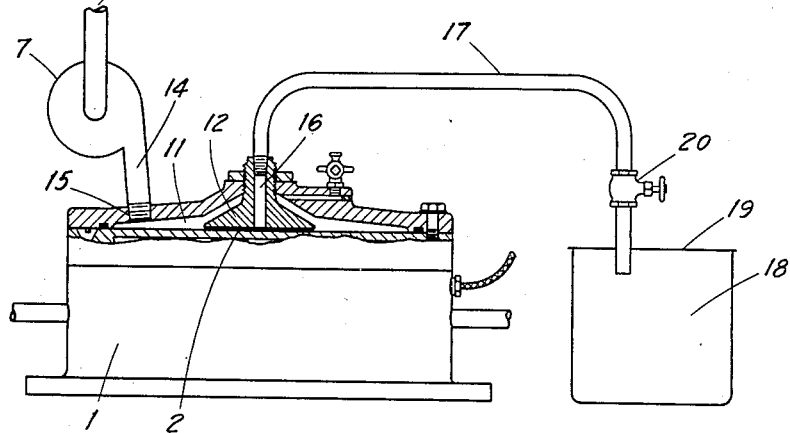
Figure 3:
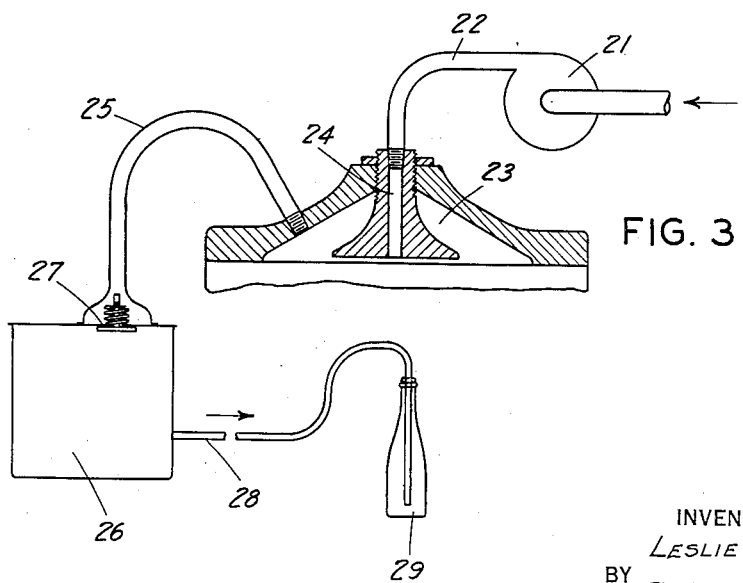

Further advantages of the method employed in the present invention will be more clearly understood from the description given below in connection with the drawing in which Fig. 1 shows schematically a method of handling the liquid; Fig. 2 shows a modification of the system set up in Fig. 1; and Fig. 3 shows a further modification which would be particularly applicable to the sterilization of such liquids as beer.

The apparatus which may be employed is similar to that described in the application of Robert L. Williams, Serial No. 674,020, filed June 2, 1933. As described in the Williams application compressional waves are produced by a so-called oscillator 1 on the diaphragm 2 of which may be formed a chamber 3 by means of the cover 4 fitting down over the diaphragm.

The liquid may be applied to the chamber 3 by means of a feed pipe 5 entering the chamber through the connection 6 at the center of the cover 4. The liquid in the feed pipe 5 may be maintained under pressure by means of a centrifugal pump 7 which is fed from the source through the supply line 8. A gage 9 may be placed in the cover connected to the chamber to indicate pressure within the chamber. By controlling the amount of flow in the pipe 8 and the velocity of the rotor of the pump 7, the pressure within the chamber 3 may be maintained at the desired value.

In the present system I have found that the pressure applied should in most cases be greater than sixty pounds per square inch in order to be sure that the surface of the liquid is not disrupted. This applies particularly in the treatment of liquids, such as milk, where there is a tendency by the application of sound waves to homogenize the cream or butter fats and therefore destroy the so-called cream line that is present in the milk bottle. In the application of the present system to the treatment of beer the same general principle applies, the pressure necessary, however, to keep the gas in the liquid depending to a good extent upon the temperature conditions and the amount of gas initially charged in the liquid.

The liquid passing through the chamber 3 is drawn off through the outlet 10. As shown in Figs. 2 and 3 this outlet may be controlled either by placing the outlet under pressure or by using a control or reducing valve so that the pressure at opposite sides of the valve may be controlled.

In Fig. 2 the oscillator 1 with the diaphragm 2 may be provided with a chamber 11 similarly as shown in the Williams application referred to above. Within the chamber 11 there may be applied a nozzle 12 whose distance from the diaphragm 2 may be regulated within a certain range. The liquid in this modification may be supplied through the supply line 13 and the centrifugal pump 7, the outlet 14 of the pump connecting to the chamber 11 at the side as indicated at 15. In this case a liquid is forced under pressure between the diaphragm 2 and the nozzle 12 and is expelled through the center opening 16 and the outlet line 17 into the tank 18 which may be closed by a cover 19 if so desired.

In the outlet pipe 17 a valve 20 may be applied by which the drop in pressure across the valve may be controlled. In the modification shown in Fig. 2 the pressure in the system before the valve 20 may be held at practically the same intensity throughout except, of course, for the slight drop in potential in the direction of the flow of the liquid.

The liquid in the arrangement shown in Fig. 2 is fed in through the side and out through the center of the system. The arrangement might be reversed and the liquid fed into the center under pressure and drawn off at the side. In this case the sound subjects the liquid as it first enters the system to the greatest compressional-wave energy.

A system of this nature is indicated in Fig. 3 in which the pump 21 raises the pressure of the liquid in the system and forces it by means of the connecting pipe 22 into the center of the chamber 23 through the inlet pipe 24. The outlet from the chamber is effected through the pipe 25 leading to the enclosed tank 26 which may be provided as indicated in the figure with a valve 27 which may be adjusted to the pressure that it is desired to maintain within the closed chamber 23. When the pressure in the system rises above the value set for the valve 27, the valve opens and the liquid will deposit in the tank 26 from which it may be drawn off as indicated by the line 28 and fed into containers such as the bottle 29.

The method is carried out as suggested in the description above. The liquid, such as milk, is fed into the system, allowed to flow over the diaphragm which produces compressional-wave vibration in the medium and is drawn off at the outlet pipe. The pressure should be maintained above the point where cavitation is present in the liquid which will prevent the disruption of the liquid surface in the chamber and particularly at the diaphragm.

In the treatment of milk in this way not only are the clumps of bacteria prevented from breaking up and spreading throughout the liquid, but also the cream is not finely dispersed as is apt to happen at the disruption of the surface where cavitation occurs. Likewise in the treatment of beer the gas remains in the liquid in solution and allows a more complete action and application of the wave energy to the medium.

Having now described my invention, I claim:

1. A method of treating milk without destroying the cream line for the destruction of bacteria which comprises causing the milk to flow across a vibrating diaphragm providing audible compressional vibrations and maintaining the milk under a static pressure of approximately sixty pounds per square inch or more in its flow sufficient to inhibit a disruption of the liquid surface of the milk.

2. A method of treating liquids for the destruction of bacteria which comprises pumping the liquid under pressure through a closed chamber agitated with audible compressional vibrations and maintaining the liquid under pressure of approximately sixty pounds per square inch or more until it has passed beyond the chamber, the pressure at all points in the flow being such that no disruption of the liquid surface takes place.

LESLIE A. CHAMBERS.